Oct. 7, 1924.

W. B. BRONANDER

ROLLER BEARING

Original Filed June 15, 1920

1,510,920

Inventor
Wilhelm B. Bronander
By his Attorney
E. W. Marshall

Patented Oct. 7, 1924.

1,510,920

UNITED STATES PATENT OFFICE.

WILHELM B. BRONANDER, OF MONTCLAIR, NEW JERSEY.

ROLLER BEARING.

Application filed June 15, 1920, Serial No. 389,153. Renewed November 15, 1923.

*To all whom it may concern:*

Be it known that I, WILHELM B. BRONANDER, a citizen of the United States, and a resident of Montclair, county of Essex, and State of New Jersey, have invented certain new and useful Improvements in Roller Bearings, of which the following is a specification.

This invention relates to anti-friction bearings of the roller type.

The objects of the invention are to provide a simple and efficient form of bearing capable of carrying both radial and thrust loads, which will be self-centering and which will be relatively inexpensive and easy to assemble.

In the accompanying drawing, I have illustrated the invention embodied in different forms, but wish it understood that further modifications may be made without departure from the true spirit and scope of the invention as herein defined and claimed.

In the drawing referred to, Figure 1 is a vertical sectional view of one of my improved bearings.

Like reference characters designate corresponding parts in the several views.

Figure 1:
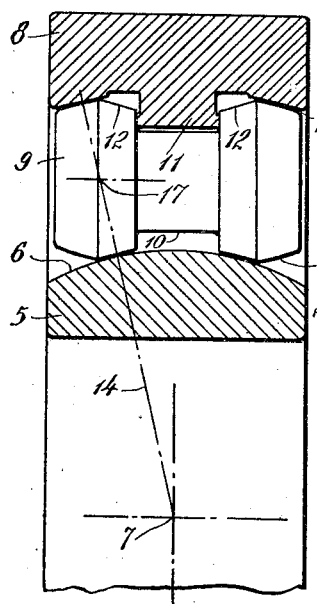

The inner bearing member is designated 5 and is shown as constructed with a convex track or bearing surface 6 formed as the segment of an arc struck from the center 7 which coincides with the center of the bearing.

The outer bearing member is designated 8. Between the outer and inner bearing members are the load carrying rolls or rollers 9. These rollers are shown as of the so-called dumb-bell type being annularly grooved intermediate their ends at 10 to receive an inwardly extending guide web or rib 11 of the outer bearing member.

The bearing rollers are each provided at opposite sides of the groove therein with inwardly facing substantially conical bearing surfaces 12 riding tangentially on the convex track of the inner bearing member at opposite sides of the center thereof.

Figure 2:
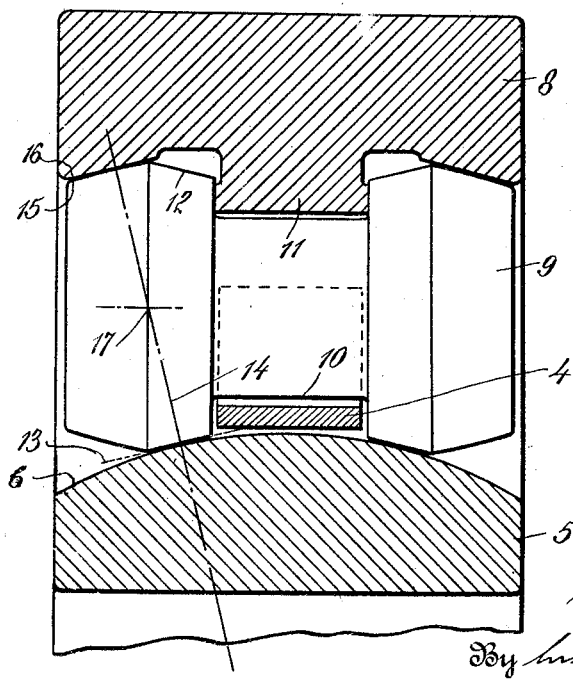
Figure 2 is an enlarged sectional view of the same to more clearly illustrate the relation of the different parts.

These oppositely disposed conical tracks on the rollers are formed, as more clearly appears in the enlarged view Fig. 2, tangential to the curvature of the convex track and on lines 13 substantially at right angles to radius lines 14 extended from the common center 7. This construction provides one-point bearing surfaces on the convex track at opposite sides of the crown thereof causing the rollers to roll freely and easily over the track without any binding tendencies.

The rollers have a bearing engagement with the outer bearing member, provided in the first form illustrated by outwardly facing convex bearing tracks 15 on the outer ends of the rollers, engaging inwardly facing substantially conical tracks 16 at the ends of the outer bearing member. These outwardly facing convex tracks of the rollers may be formed as arcs drawn from the common center 7 and the tracks 16 of the outer bearing member are disposed tangential to these convex tracks and on planes at right angles to the radii 14. It will be noted that these radii 14 pass through the centers of the rollers at the line 17 separating the conical tracks 12 from the convex tracks 15 of the rollers, and that the load therefore is carried by the rollers between the diagonally opposite tangential faces at 12 and 16 respectively. This reduces the bearing surfaces to a minimum and at the same time makes the bearing self-centering in every way. It will also be noted that the diagonally opposite tangential surfaces 12 and 16 both standing at right angles to the same radius are in substantial parallelism to each other. This also is an important factor in the manufacture and operation of the device.

Figure 3:
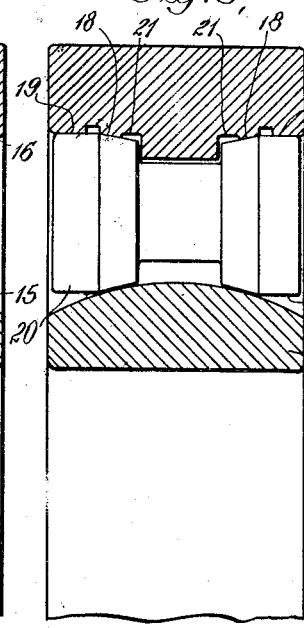
Figures 3, 4 and 5 are sectional views of modified forms of the invention.
Figure 4:
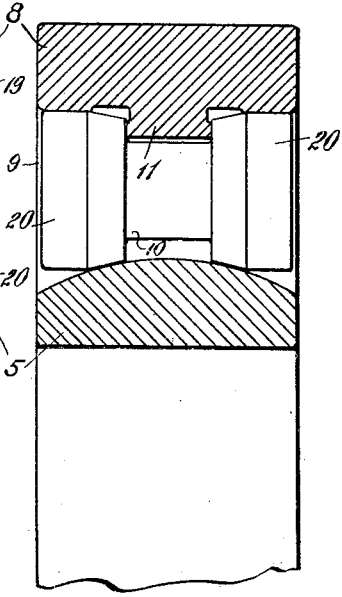
Figure 5:
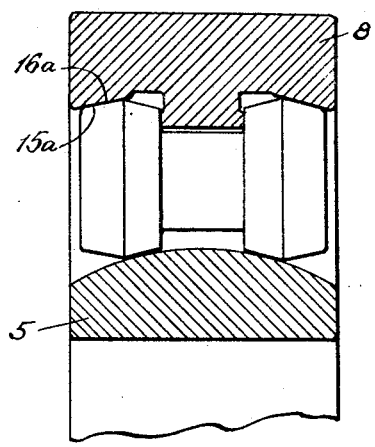

In Figures 3, 4 and 5 I have illustrated how the bearing engagement between the rollers and the outer bearing member may be modified in various ways. Thus, in Fig. 3 the outer bearing member is constructed with outwardly facing conical bearing tracks 18 riding on the inwardly facing conical tracks of the rollers for the purpose of centering the rollers and with cylindrical bearing tracks 19 at the outer ends of the same bearing on corresponding cylindrical tracks 20 at the outer end of the rollers. As the tracks 18 serve principally for centering purposes, they may be relatively narrow in extent and may be relieved or cut away at their inner ends, as indicated at 21 for the purpose of reducing the areas in contact.

In Fig. 4 the rollers are constructed as in Fig. 3, that is with the outer cylindrical tracks 20 for carrying the radial load and the centering is accomplished in this instance, entirely by the guide web 11 which engages the opposite walls of the annular grooves 10 in the rollers so as to confine the rollers to movement in a straight path. In the other forms shown in which other parts are provided to oppose the thrust, this web keeps the rollers in paralellism and assists in taking the thrust.

The construction illustrated in Fig. 5 differs from that first disclosed, in that the outwardly facing tracks 15ª at the ends of the rollers are of conical design to match the inwardly facing conical tracks 16ª of the outer bearing member.

The guide rib of the outer bearing member, in addition to centering and keeping the rollers in a straight rolling path, also serves to strengthen the outer bearing member, which is an important item where the bearing is to carry heavy loads. As the convex track of the inner bearing member is formed as an arc drawn from the center of the member, said member may be considered as the central zone of a sphere.

In all of the forms disclosed, it will be noted that the bearing carries both the radial and thrust loads with a minimum of friction and that the bearing is entirely self-contained and self-aligning. If desired to space the rollers a retainer 4, as shown in Fig. 2, may be used.

What I claim is:

1. A roller bearing comprising cooperating bearing members and rollers therebetween, one of said members having a convex bearing track, the rollers having inwardly facing substantially conical bearing surfaces engaging said convex track and standing at tangents thereto, said rollers further having outwardly facing convex bearing surfaces and the other bearing member having inwardly facing substantially conical bearing tracks opposed to said convex bearing surfaces of the rollers and standing substantially at tangents thereto.

2. A roller bearing comprising cooperating bearing members and rollers therebetween, one of said members having a convex bearing track, the rollers having inwardly facing substantially conical bearing surfaces engaging said convex track and standing at tangents thereto, said rollers further having outwardly facing convex bearing surfaces, and the other bearing member having inwardly facing substantially conical bearing tracks opposed to said convex bearing surfaces of the rollers and standing substantially at tangents thereto, the convex tracks of the bearing member and of the rollers being all drawn as arcs from a single common center.

3. A roller bearing comprising cooperating bearing members and rollers therebetween, the inner member having a convex bearing track, the rollers having inwardly facing substantially conical bearing surfaces engaging said convex track and standing at tangents thereto, said rollers further having outwardly facing convex bearing surfaces, and the outer member having inwardly facing substantially conical bearing tracks opposed to said convex bearing surfaces of the rollers and standing substantially at tangents thereto.

4. A roller bearing comprising cooperating bearing members and rollers therebetween, one of said members having a convex bearing track, the rollers having inwardly facing substantially conical bearing surfaces engaging said convex track and standing at tangents thereto, said rollers further having outwardly facing convex bearing surfaces, and the other bearing member having inwardly facing substantially conical bearing tracks opposed to said convex bearing surfaces of the rollers and standing substantially at tangents thereto, the convex tracks of the bearing member and of the rollers being all drawn as arcs from a single common center, and each pair of the diagonally opposite tangential surfaces of the rollers and bearing member standing substantially at right angles to a radius drawn from the common center aforesaid.

5. A roller bearing comprising cooperating bearing members and rollers therebetween, one of said members having a convex bearing track, the rollers having inwardly facing substantially conical bearing surfaces engaging said convex track and standing at tangents thereto, said rollers further having outwardly facing convex bearing surfaces, and the other bearing member having inwardly facing substantially conical bearing tracks opposed to said convex bearing surfaces of the rollers and standing substantially at tangents thereto, the convex tracks of the bearing member and of the rollers being all drawn as arcs from a single common center, and the diagonally opposite tangential surfaces of the rollers and bearing member standing substantially at right angles to a radius drawn from the common center aforesaid which radius passes through the center of a roller on a line separating the conical and convex bearing surfaces thereof.

6. A roller bearing comprising an inner bearing member having a convex track, rollers having inwardly facing conical bearing surfaces tangential to said convex track and bearing thereon, an outer bearing member and other bearing surfaces on the rollers cooperating with the outer bearing member.

7. A roller bearing comprising cooperating bearing members and rollers therebetween, one of said bearing members having a convex track and the rollers having inwardly facing substantially conical bearing surfaces standing substantially tangential to the convex track and bearing thereon, said conical bearing surfaces being disposed at the intermediate portions of the rollers, and said rollers having outer bearing surfaces at the ends thereof and beyond the conical bearing surfaces for engagement with the other bearing member.

8. A roller bearing comprising outer and inner bearing members and rollers therebetween, said rollers being grooved intermediate their ends, and one of the bearing members having a guiding rib entering the grooves in said rollers and engaging the side walls of the same to limit the endwise movement of the rollers, the other bearing member having a convex track and the rollers having inwardly facing substantially conical surfaces at opposite sides of the grooves therein and standing substantially tangential to the convex track.

9. A roller bearing comprising opposed bearing members and supporting rollers engaged therebetween, said rollers having bearing surfaces at the end portions of the same engaging one of the bearing members and inwardly facing substantially conical bearing surfaces inside the end bearing surface, and the other bearing member having a convex track engaged by said conical surfaces at opposite sides of the crown thereof.

10. In a bearing of the character described, a bearing member having a track forming a portion of the surface of a sphere, rolling elements having tangential contact with said track at opposite sides of the center thereof and a cooperating bearing member having a centrally located annular guide rib projecting between the rolling elements and tracks at opposite sides of the same in engagement with said rolling elements.

11. In a bearing of the character described, cooperating bearing members, one having a convex track and the other having tracks opposed to the same, an annular guide rib on said last mentioned member and rolling elements having tangential engagement with the convex track of the one member, engaging the tracks of the cooperating member and confined in their thrust movements by the guide rib aforesaid.

12. A roller bearing comprising an inner bearing member having a convex bearing surface, an outer bearing member having inwardly facing conical bearing surfaces and rollers mounted between said members and having different surfaces coacting with the bearing surfaces of said members.

13. A roller bearing comprising an inner bearing member having a convex bearing surface, an outer bearing member having inwardly facing conical bearing surfaces and rollers mounted between said members and having different surfaces coacting with the bearing surfaces of said members, the bearing surfaces of the rollers being disposed tangential to the convex bearing surface of the inner bearing member.

In witness whereof, I have hereunto set my hand this 11th day of June, 1920.

WILHELM B. BRONANDER.